(12) United States Patent
des Garennes et al.

(10) Patent No.: US 8,640,636 B2
(45) Date of Patent: Feb. 4, 2014

(54) DEVICE FOR PLACING MATERIAL ON OR BENEATH THE SOIL SURFACE

(75) Inventors: Chris des Garennes, Elkton, MD (US); Peter van Drumpt, Wayside, NJ (US)

(73) Assignee: BASF Agro B.V., Zurich (CH)

( * ) Notice: Subject to any disclaimer, the term of this patent is extended or adjusted under 35 U.S.C. 154(b) by 336 days.

(21) Appl. No.: 13/033,390

(22) Filed: Feb. 23, 2011

(65) Prior Publication Data

US 2011/0203500 A1 Aug. 25, 2011

Related U.S. Application Data

(60) Provisional application No. 61/307,184, filed on Feb. 23, 2010.

(51) Int. Cl.
*A01M 17/00* (2006.01)
*A01M 21/04* (2006.01)
*A01C 23/02* (2006.01)

(52) U.S. Cl.
USPC .............. 111/7.3; 111/7.4; 111/127; 111/900

(58) Field of Classification Search
USPC .................... 111/118, 7.1–7.4, 200, 900, 127
See application file for complete search history.

(56) References Cited

U.S. PATENT DOCUMENTS

| | | |
|---|---|---|
| 2,841,923 A | 7/1958 | Dickison |
| 3,012,526 A | 12/1961 | Baldwin et al. |
| 3,029,756 A | 4/1962 | Krivda |
| RE25,307 E | 12/1962 | Johnston |
| 3,405,669 A | 10/1968 | Nimrick |
| 3,435,785 A | 4/1969 | Harbolt |
| 3,521,819 A | 7/1970 | Johnston |
| 3,538,867 A | 11/1970 | Every et al. |
| 3,589,054 A | 6/1971 | Pascucci |
| 3,598,323 A | 8/1971 | Johnston et al. |
| 3,815,525 A | 6/1974 | Kainson et al. |
| 3,875,876 A | 4/1975 | Pustovoit et al. |
| 4,009,666 A | 3/1977 | Russell et al. |
| 4,624,193 A | 11/1986 | Johnston |
| 4,807,544 A | 2/1989 | Cross et al. |
| 4,907,516 A | 3/1990 | Rogers |
| 5,092,362 A | 3/1992 | Yie |
| 5,101,745 A | 4/1992 | Podevels et al. |
| 5,117,872 A | 6/1992 | Yie |

(Continued)

FOREIGN PATENT DOCUMENTS

| | | |
|---|---|---|
| DE | 831784 | 2/1952 |
| EP | 084486 | 7/1983 |
| WO | 0124605 A1 | 4/2001 |
| WO | 2008000970 A1 | 1/2008 |

OTHER PUBLICATIONS

International Search Report and Written Opinion for PCT/US2011/025908, dated Jun. 9, 2011.

(Continued)

*Primary Examiner* — Christopher J Novosad
(74) *Attorney, Agent, or Firm* — Armstrong Teasdale LLP

(57) ABSTRACT

A device for treating soil includes a soil contact head having at least one discharge orifice therein, a handle attached to the soil contact head, a discharge valve in fluid communication with the at least one discharge orifice, a soil contact indicator, and a source of pressurized soil treatment fluid flowably connected to the discharge valve. The discharge valve discharges the pressurized soil treatment fluid through the at least one discharge orifice when the soil contact indicator indicates contact between the soil contact head and the soil.

47 Claims, 11 Drawing Sheets

(56) References Cited

U.S. PATENT DOCUMENTS

| | | |
|---|---|---|
| 5,119,744 A | 6/1992 | Comer |
| 5,186,393 A | 2/1993 | Yie |
| 5,207,168 A | 5/1993 | Comer |
| 5,241,986 A | 9/1993 | Yie |
| 5,291,842 A | 3/1994 | Sallstrom et al. |
| 5,297,777 A | 3/1994 | Yie |
| 5,322,418 A | 6/1994 | Comer |
| 5,370,069 A | 12/1994 | Monroe |
| 5,394,812 A | 3/1995 | Dunning et al. |
| 5,487,346 A | 1/1996 | Taylor |
| 5,503,091 A | 4/1996 | Foster et al. |
| 5,524,821 A | 6/1996 | Yie et al. |
| 5,575,224 A | 11/1996 | Rogers |
| 5,605,105 A | 2/1997 | Clark et al. |
| 5,653,292 A | 8/1997 | Ptacek et al. |
| 5,741,090 A | 4/1998 | Dunning et al. |
| 5,983,559 A | 11/1999 | Manabe |
| 6,142,084 A | 11/2000 | Hatl |
| 6,431,096 B1 | 8/2002 | Engelke et al. |
| 6,722,298 B2 | 4/2004 | Engelke et al. |
| 6,860,336 B2 | 3/2005 | Robillard |
| 6,892,657 B2 | 5/2005 | Engelke et al. |
| 6,939,085 B1 | 9/2005 | Posch |
| 7,581,684 B2 | 9/2009 | Des Garennes et al. |

OTHER PUBLICATIONS

International Search Report and Written Opinion for PCT/US2011/025919, dated Jun. 16, 2011.

International Search Report and Written Opinion for PCT/US2011/025929 dated Jun. 16, 2011, 60 pages.

DEVICE FOR PLACING MATERIAL ON OR BENEATH THE SOIL SURFACE

CROSS REFERENCE TO RELATED APPLICATION

This application claims priority to U.S. Provisional Patent Application Ser. No. 61/307,184, filed on Feb. 23, 2010, which is incorporated herein by reference in its entirety.

BACKGROUND

The field of the disclosure relates to soil treatments, and more particularly to the injection of soil treatments below the surface of the soil adjacent to obstructions, in a manner which does not mechanically disturb the soil surface.

The insertion of soil treatments below the surface of the soil has been practiced as a way of limiting the wash off of the treatments. Typical devices for implementing such soil treatments utilized needles or other mechanical devices to create a passageway into the soil to allow the soil treatment to be inserted into the ground. These devices have the obvious limitation that they create holes in the soil, which may be unsightly, or create other adverse concerns, such as unwanted soil compaction adjacent the insertion sights, as well as require the creation of the hole using mechanical forces.

The use of high pressure as a method of effectively injecting materials below the soil surface has been described in U.S. Pat. No. 5,370,069 to Monroe, titled Apparatus and Method for Aerating and/or Introducing Particulate Matter into a Ground Surface. These methods use high pressure jets of a fluid, such as air or water that entrain the soil treatment agent. The soil treatment agent may be in solution with the fluid, or may be a granular material carried with the fluid. The high pressure jet can form a small hole in the surface into which the material is being placed, or cause the material to be absorbed by the surface in a rapid fashion, such that soil disturbance is minimal. One benefit of the use of a pressure jet is that no mechanical effort is required to create a passageway as a predicate for the soil treatment material to be placed below the surface of the soil.

While devices such as that disclosed in Monroe are effective at placing soil treatment materials below the surface, they are tailored to distribution of such materials over a large area, where the size of the equipment is not a limitation. For example, the device, described in U.S. Pat. No. 7,581,684, includes a towed device which can be used to provide accurate distribution of soil treatment material over a broad area. This device is limited, however, in placing soil treatments next to structures, such as walls, fences, and/or trees or other landscape features, due to challenges associated with maneuvering the device close to the structure.

Through the use of a high pressure and/or velocity stream of soil treatment material, the material can be injected without disruption of the surface being treated. One aspect which improves this performance is the close proximity of the injector to the surface itself, such that the flow of soil treatment material does not disperse into the air when the injector is spaced apart from the surface. Additionally, contact between the injector and the soil being treated limits the ability of the soil treatment to bounce off of the soil to which the treatment is being applied.

As a result of the high pressure utilized, it is desired to address safety concerns for an operator of the device. Although the energy of a short duration flow of soil treatment material will dissipate as it travels through air, the flow can be harmful to objects located near the discharge orifices. Furthermore, such dissipation of the energy will limit soil penetration for a given pressure. Accordingly, actuation of a high pressure flow of soil treatment material only when the discharge orifices are close to the soil increases the effectiveness of the delivery device.

SUMMARY OF THE DISCLOSURE

The method and device described herein provide a way of successfully placing fluids or fluids with granular materials entrained therein (hereafter referred to collectively as "soil treatment fluid" or "soil treatment fluids") into the ground, particularly adjacent structures such as buildings, fences, and trees and other landscaping features, in a safe manner without mechanically penetrating the soil. The soil treatment material may include, but not limited to, fertilizers and other soil conditioning materials and insect treatments, such as insecticide barriers placed around the perimeter of a structure. The device allows utilization of soil penetration without the limitations of larger devices such as described in U.S. Pat. No. 7,581,684, incorporated herein in its entirety by reference. The jets, using water or air blasts for example, may carry the material into the soil and leave no eruption on the surface to interfere with any immediately following activities or other treatments.

The device may be embodied in a soil treatment device having at least one discharge orifice. The soil treatment device may include a handle, a discharge valve, a soil contact indicator, a source of pressurized soil treatment fluid, and a soil contact head, in which the discharge orifice is located. The discharge valve may be triggered as a result of sufficient force being applied by the soil contact head against the ground, such that a pulse of pressurized soil treatment fluid is injected into the ground. In a further embodiment, the device may also include a joint providing one or more degrees of rotation between the soil contact head and the handle, allowing the soil contact head to be oriented in a preferred position with respect to the soil.

DETAILED DESCRIPTION OF THE DISCLOSURE

It is to be understood that the figures and descriptions of embodiments of the present invention have been simplified to illustrate elements that are relevant for a clear understanding of the disclosure, while eliminating, for the purpose of clarity, many other elements found in typical turf and soil management systems and methods known to those of ordinary skill in the art. However, because such elements and steps are well known in the art, and because they do not facilitate a better understanding of the present invention, a discussion of such elements and steps is not provided herein.

Figure 1:
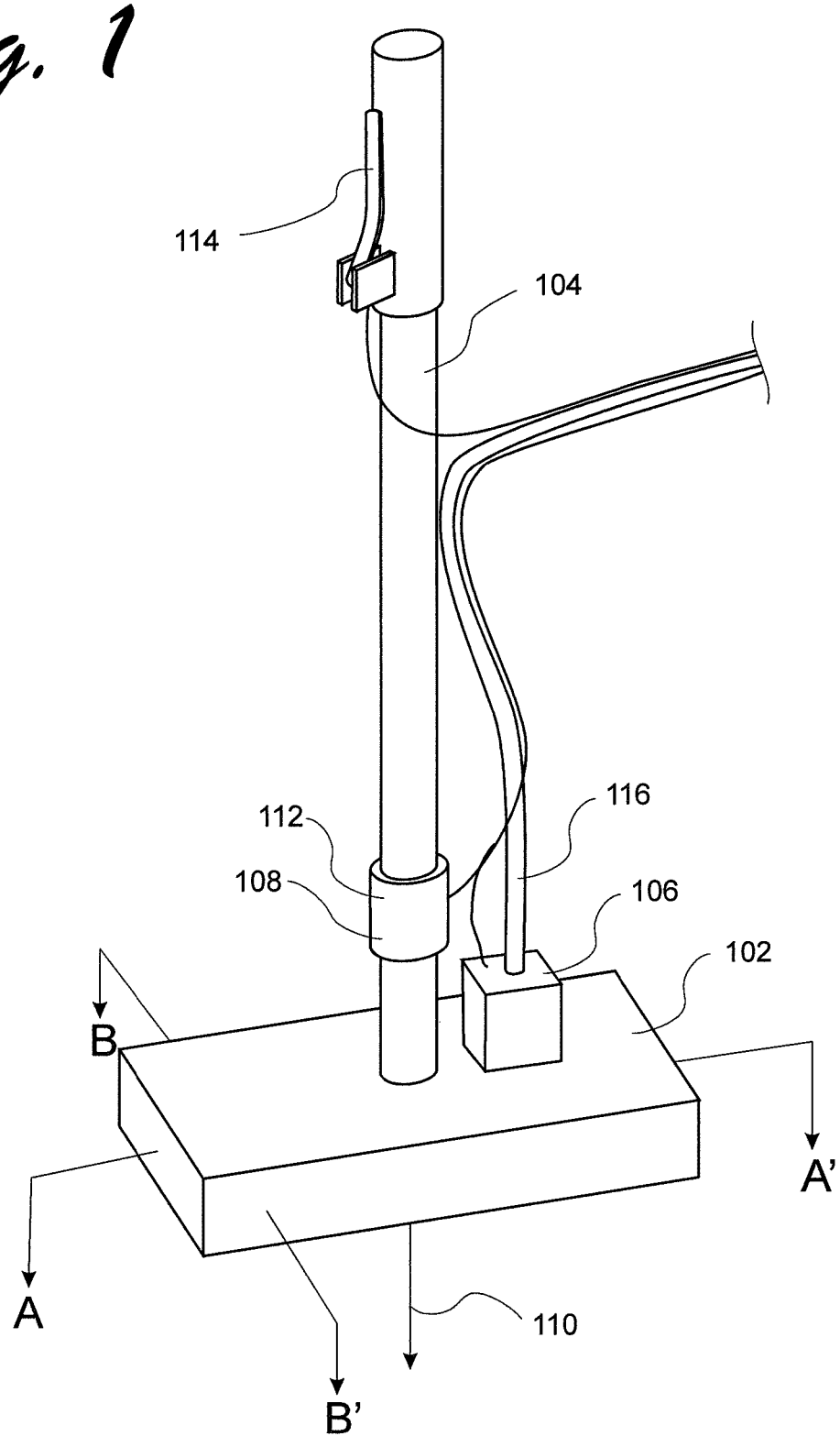
FIG. 1 illustrates a simplified portable device for placing soil treatments in an exemplary embodiment of the present invention in a perspective view.

In its simplest form, as shown in FIG. 1, an exemplary embodiment of the present invention may be embodied in a device 100 having a head 102 for contacting the soil, and a handle 104 for allowing the user to maneuver the soil contact head 102. The soil contact head 102 may be provided with one or more discharge orifices (not visible in FIG. 1) through which a soil treatment fluid can be forced, at high pressure. The soil contact head 102 may be supplied with pressurized soil treatment fluid either from a reservoir attached to the soil treatment device 100, or from a remote source. The flow of the soil treatment fluid from the pressurized soil treatment supply may be controlled by a discharge valve 106. The discharge valve 106 may be actuated by a soil contact indicator 108.

As discussed above, the soil treatment fluid may include a soil treatment entrained with a fluid, such as, but not limited to, a treating agent in solution with water, or a granular material entrained with water or air. As several limitations exist with regard to flowing granular materials through hoses, it may be preferred to entrain a granular material adjacent the output of the soil treatment device. Granular materials may require that a hopper (shown in FIG. 8) be provided as a result of these limitations, which include the abrasive nature of entrained granular materials, and the tendency of such materials to clog within hoses. In addition, the implementation of a venturi system adjacent the discharge nozzles to entrain the material into the fluid jet, such as shown in U.S. Pat. No. 7,581,684 may be used.

The soil contact indicator 108 may be a pressure or force sensor which measures the force with which the soil contact head is urged into contact with soil to be treated. Preferably, the soil contact indicator 108 is configured to generate a signal based on force applied in a direction substantially parallel to the direction of flow 110 of soil treatment fluid from the one or more discharge orifices. Such orientation assures that sufficient contact between the soil contact head 102 and the soil is present such that any reaction force from a discharge from the discharge orifices is counterbalanced by the force with which the soil contact head 102 has been forced against the soil, minimizing movement of the soil contact head 102 from the intended location. The inclusion of the soil contact indicator 108 further assures that the soil contact head 102 is in contact with the soil at the time of discharge, minimizing the likelihood of a safety issue arising from a discharge wherein the discharge orifices are not directed against the soil.

The weight of the soil contact head 102 may be selected, such that the mass of the soil contact head 102 assists in retaining the soil contact head 102 in position during a discharge from the discharge outlets, without being unduly burdensome for manual positioning of the soil contact head 102 by an operator. In general, the lighter the mass of the soil contact head 102, the greater the force that the operator applies prior to actuating a discharge of soil treatment material from the discharge orifices.

Illustratively, the soil contact indicator 108 may be formed via incorporation of a load cell 112 into the handle 104 to measure force directly, or via a contact switch triggered by displacement of a portion of the handle 104 relative to the soil contact head 102. While these methods illustrate basic methods of obtaining an indication of sufficient force applied, they are illustrative only, and not intended to limit available methods of practicing the present invention.

The use of a load cell 112 as part of the handle 104 allows a discrete measurement of how much force is being applied though the handle 104, as well as tailoring the required force based on other parameters, such as discharge pressure or user preferences. Use of a single axis load cell 112 allows force parallel to the axis of the handle 104 to be measured, such that a contact signal may be generated when the force exceeds a desired amount. The signal may be used as the trigger to direct the discharge valve 106 to release soil treatment fluid for a period of time. The period of time, in conjunction with the supply pressure, may be selected to obtain a desired soil penetration. Accordingly, when the load cell 112 signals that a desired force has been applied through the handle 104, the discharge valve 106 may open for a period of time to allow the flow of high pressure soil treatment fluid out of the discharge orifice or orifices (not shown in FIG. 1), such that the soil treatment material is injected into the soil.

The use of a multi-axis load cell may also be implemented, however the measurement of forces in multiple axes may require resolution of the forces into a single relevant value for actuation purposes. For example, where a multi-axis load cell is used, the measured forces may be resolved to indicate the force being transmitted through the load cell in an axis parallel to the vertical axis of the soil contact head.

The discharge valve 106 may be a solenoid operated poppet valve capable of sufficiently rapid operation to allow opening and closing of the valve within the desired time parameters to allow correct depth penetration of the soil based on the pressure in use. While it is possible to use a hydraulically actuated valve, the size and weight constraints of such a valve may otherwise limit the utility of the device 100.

In addition to the discharge valve 106, an actuation trigger 114 may be provided, such that the soil contact indicator 108 is only enabled when an operator has activated the actuation trigger 114. The actuation 114 may be a mechanical device, which interrupts the flow of soil treatment fluid from the discharge valve 106 to the orifices, or may be an electrical switch which interrupts the electrical signal to the discharge valve 106, thus preventing actuation of the discharge valve 106.

The discharge valve 106 may use a solenoid to open and close the valve controlling flow of soil treatment fluid, such that either the power supply for the solenoid, or the signal from the soil contact indicator 108 may be interrupted. Control of the discharge valve 106 may be either co-located with the discharge valve 106, or remotely located with a discharge controller, such that the parameters of each injection may be individually controlled as a result of the control of pressure and flow duration. Additionally, where a load cell 112 is used to directly measure contact force, the force sufficient to initiate a discharge may be additionally variable, such that an operator can increase or decrease the force needed for activation, as the operator prefers. Additionally, the controller 1012 (shown in FIG. 11) can be used to impose limits, i.e., soil contact force thresholds which act as a minimum force required, or which impose minimum or maximum soil treatment flow durations. An electrical connection 115 links the discharge valve 106, the soil contact indicator 108 and the actuator trigger 114 with the controller 1012.

Figure 2:
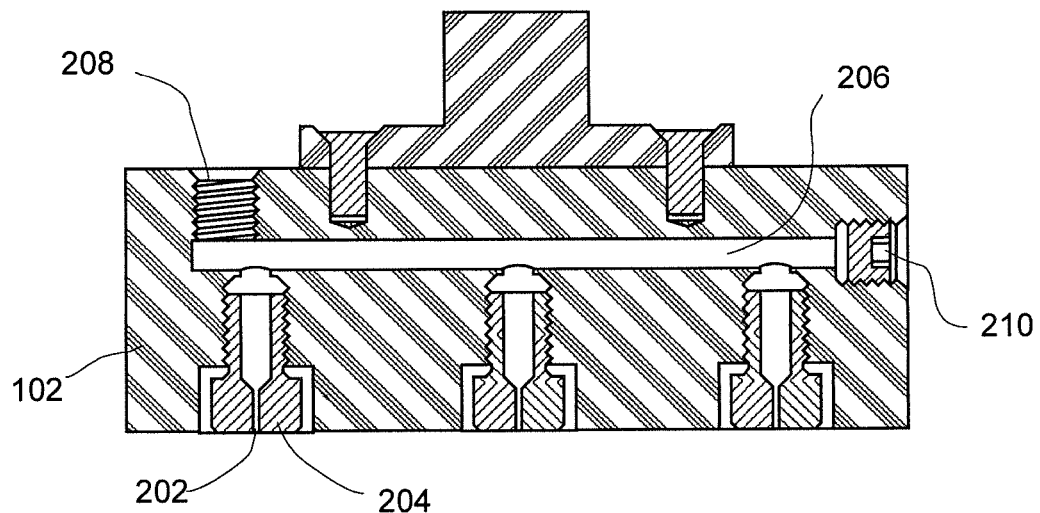
FIG. 2 illustrates a simple soil contact head shown in cross-section along lines A-A' in FIG. 1.

FIG. 2 illustrates a soil contact head 102 shown in cross-section in the plane shown as A-A' in FIG. 1. The soil contact head 102 may have a plurality of discharge orifices 202. The discharge orifices 202 may be formed in discharge nozzles 204 which are replaceable within the soil contact head 102. Discharge nozzles are commercially available from TeeJet Technologies, Springfield, Ill. Discharge orifices 202 may have an internal diameter of 0.0020" to 0.001, although the useful diameter is purely dependant on the desired penetration, and pressure available. Discharge nozzles 204 may be coupled to internal passage(s) 206. Internal passage(s) 206 may include an inlet port 208. In order to allow fabrication, the internal passage may be closed by a plug 210.

Figure 3:
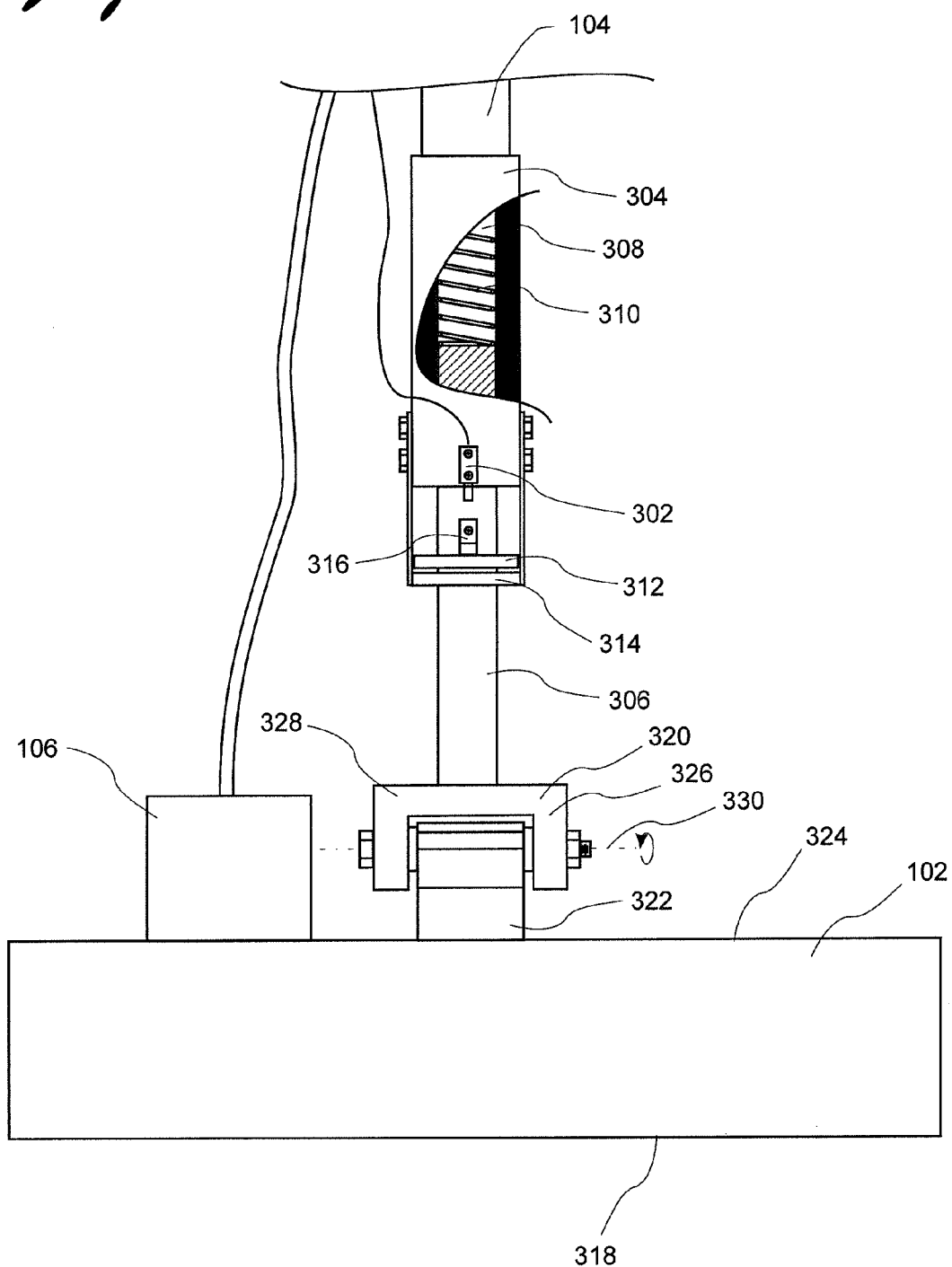
FIG. 3 illustrates a portable device for placing soil treatments in an exemplary embodiment of the present invention using a contact switch and a single degree of rotational freedom in a front view, with a partial cutaway of the handle.

As shown in FIG. 3, the soil contact indicator 108 may alternately be formed from a contact switch 302 adapted to indicate when an upper portion 304 of the handle 104 has been displaced closer to a lower portion 306 of the handle 104. The upper handle portion 304 may be hollow 308, such that the lower handle portion 306 nests slidably within the upper handle portion 304. A spring 310 may be placed within the hollow portion 308 of the upper handle 304 to resist the lower handle portion 306 sliding further into the upper handle portion 304. A flange 312 and retainers 314 may be provided to limit the ability of the lower handle 306 to be withdrawn or ejected from the upper handle portion 304, ensuring that the lower handle portion 306 remains attached to the upper handle portion 304. A simple contact switch 302 may be disposed on the upper or lower handle, such that contact between the switch 302 and a stop block 316 provides a soil contact indication after the spring 310 has been compressed. The resistance of the spring 310 maybe selected to provide a sufficient force level before a soil contact signal is indicated. The position of the contact switch 302 and/or contact block 316 may be adjustable to allow the force applied to the handle 104 to be varied before the contact switch 302 makes contact, thus generating a trigger signal.

The contact switch 302 may close a circuit energizing the solenoid associated with the discharge valve 106, such that closure of the contact switch 302 applies a voltage to the discharge valve 106. Alternately, the closure (or opening) of the contact switch 302 may be used to provide a signal to a controller (not shown in FIG. 3), such that the controller controls the discharge valve 106 in accordance with receipt of a soil contact signal from the contact switch 302. The controller may be used to create a time lag between actuation of the contact switch 302 and a discharge, and to ensure that proper parameters are present for a discharge, i.e., proper fluid pressure being available.

The connection between the handle 104 and the soil contact head 102 may preferably be provided with one or more degrees of rotational freedom, such that the soil contact head 102 is able to be readily urged into an optimal orientation prior to a discharge. Use of a substantially planar bottom surface 318 for the soil contact head 102 will allow the soil contact head 102 to be urged into a parallel orientation against soil in which the soil contact head 102 is forced, thus minimizing the distance between the discharge orifices (not shown in FIG. 3) and the soil, as well as limiting the likelihood of a discharge not constrained by soil.

As shown in FIG. 3, a single degree of rotational freedom may be created between the soil contact head 102 and the handle 104 by the formation of a yoke 320 between the handle 104 and the soil contact head 102. A protrusion 322 may be formed in the top surface 324 of the soil contact head 102, such that the legs 326, 328 of the yoke 320 attach to each side of the protrusion 322 in a rotationally free manner, allowing the soil contact head 102 to rotate about an axis 330 extending through the connection points of the yoke 320. The orientation of the yoke 320 with respect to the soil contact head 102 may be selected based on conditions under which the device is to be used.

Figure 4:
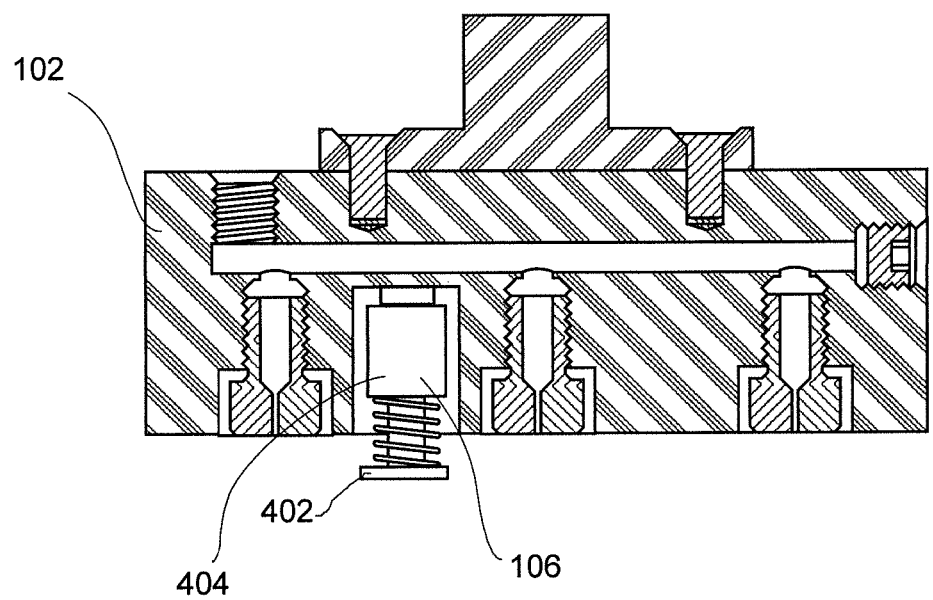
FIG. 4 illustrates a soil contact head in cross-section for a portable device for placing soil treatments in an exemplary embodiment of the present invention using a ground contact probe as a soil contact indicator.

As shown in FIG. 4, the soil contact indicator 108 does not necessarily need to be integrated between the handle 104 and the soil contact head 102, but rather may measure a contact between the soil contact head 102 and the soil against which the soil contact head 102 may be forced. A simple spring loaded plunger 402, with a contact switch 404 actuated once the plunger 402 has been depressed a certain amount, may be implemented. While such a soil contact indicator 108 works functionally, an uneven soil surface may limit the utility of such an embodiment, as the contact indicator 108 may need to generate a signal when the plunger 402 is still protruding from the soil contact head 102, such that a gap between the soil contact head 102 and the soil may exist at the time of discharge. While this is common to the discharge parameters associated with a soil contact indicator 108 located between the handle and the soil contact head when the soil presents a concave surface to the soil contact head 102, the gap is increased compared to a device using a handle mounted indicator when the ground presents a flat or convex surface.

Figure 5A:
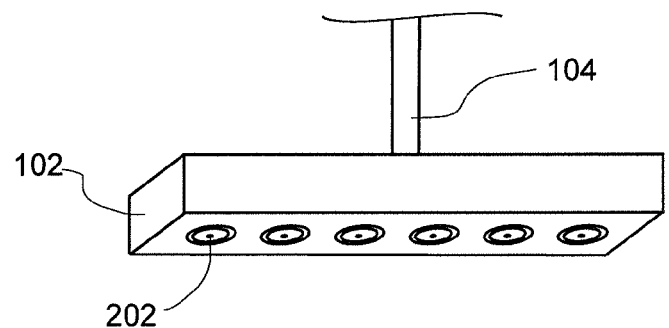
FIG. 5A illustrates a soil contact head for a portable device for placing soil treatments in an exemplary embodiment of the present invention, wherein the soil contact head utilizes a row of discharge orifices.
Figure 5B:
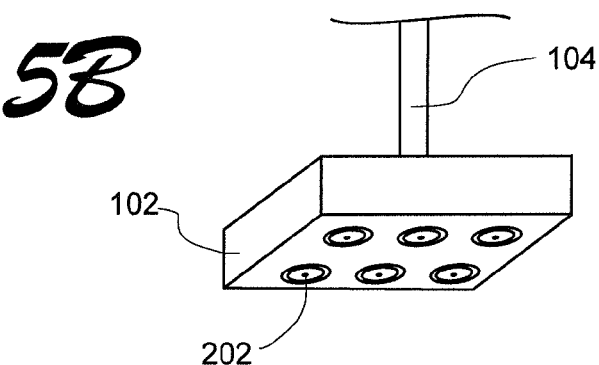
FIG. 5B illustrates a soil contact head for a portable device for placing soil treatments in an exemplary embodiment of the present invention, wherein the soil contact head utilizes a matrix of discharge orifices.
Figure 5C:
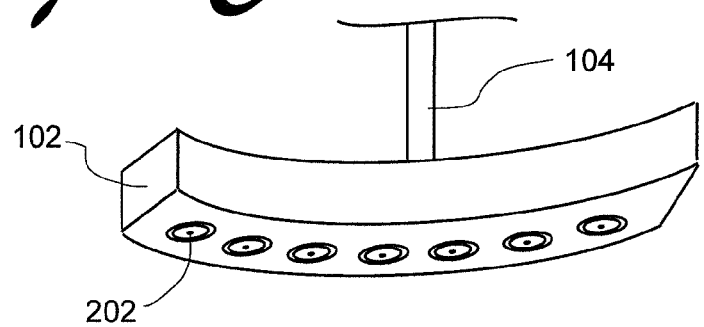
FIG. 5C illustrates a soil contact head for a portable device for placing soil treatments in an exemplary embodiment of the present invention, wherein the soil contact head utilizes an arcuate shape.

The size and shape of the soil contact head 102 may be selected based on the particular application for which the device is intended to be used. The soil contact head 102 may use a shape having a high length to width ratio when the device is to be used to apply a soil treatment material along a long straight perimeter, such as a wall. The soil contact head 102 may have multiple orifices 202 formed therein. The orifices 202 may be formed in a row, such as shown in FIG. 5A. Should a deeper boundary be desired, the orifices 202 may be arranged in a matrix pattern (rows and columns) as shown in FIG. 5B, or in any other pattern desired for the intended usage. Although the soil contact heads 102 illustrated herein present a generally rectangular lower surface, the contact heads can be formed in any shape desired, such as the arcuate shape such as shown in FIG. 5C, which my be used to conform around circular edges, such as around trees and landscape plantings. Care may be taken to ensure that adequate distribution of soil treatment fluids occur between discharge orifices 202 where multiple discharge orifices 202 are used with a single discharge valve 106. Restrictions in manifolds, i.e., reduced manifold runner diameters, may be implemented for discharge orifices 202 located near a single discharge valve 106 to balance the flow from the discharge orifices 202, or multiple discharge valves 106 may be used to better balance the output from the discharge orifices 202.

Figure 6:
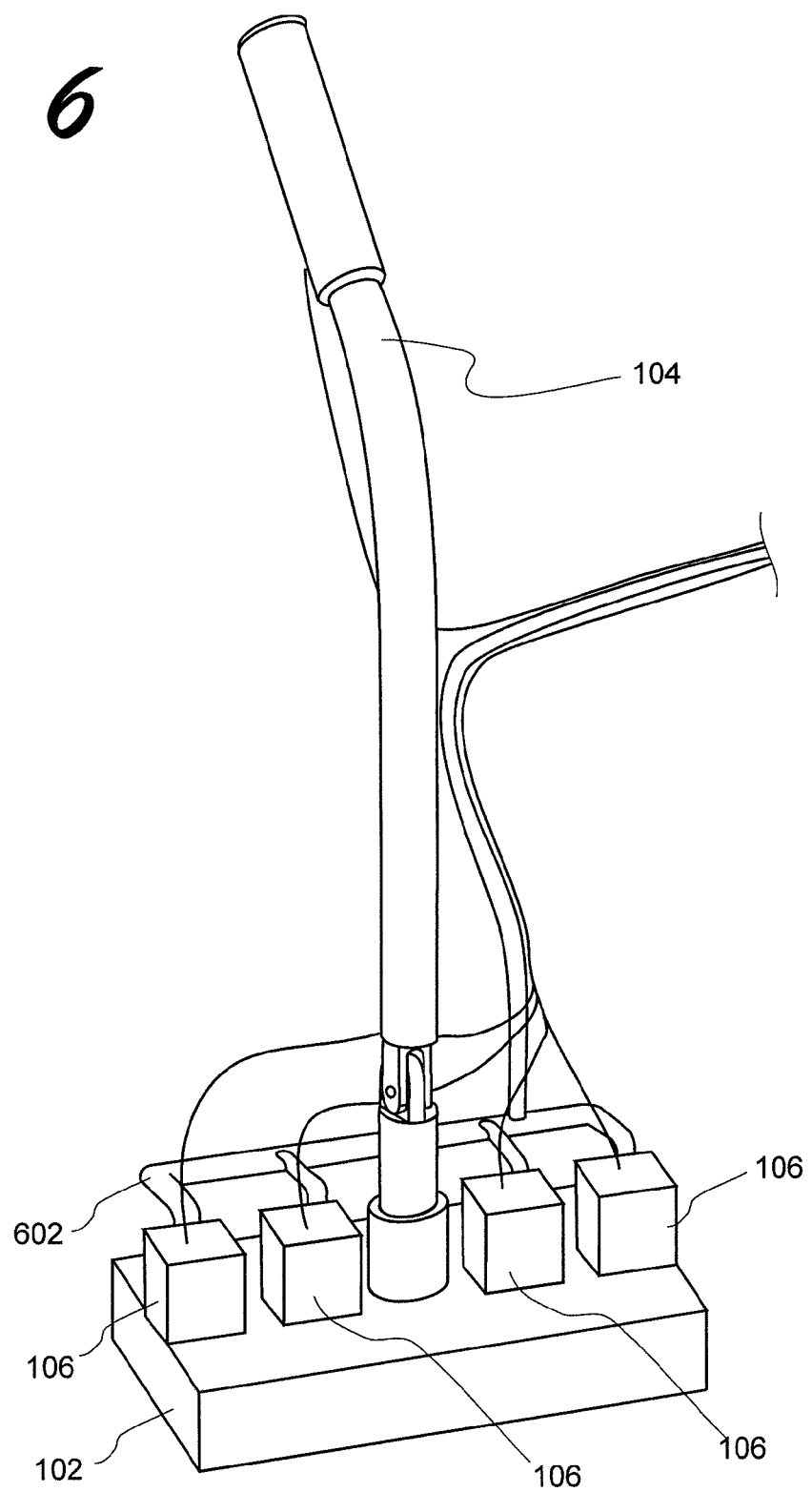
FIG. 6 illustrates a portable device for placing soil treatments an exemplary embodiment of the present invention, utilizing multiple discharge valves.

As shown in FIG. 6, the soil contact head 102 may have a discharge valve 106 associated with each discharge orifice 202 (not visible in FIG. 6), such that even distribution of soil treatment fluid across a plurality of discharge orifices 202 may be ensured. While discharge balancing can be obtained within reasonable parameters simply through proper sizing of manifold runners 602, and multiple discharge valves 106 may be used, such that pressurized soil treatment fluid contained in a feed hose supplying each discharge valve 106 may provide an effective accumulator, ensuring that adequate soil treatment fluid is available for each discharge orifice 106. While FIG. 6 shows the extreme of one discharge valve 106 per discharge orifice, multiple discharge valves 106 may be provided at other ratios, i.e., one discharge valve 106 for every, 2, 3, or 4, etc. discharge orifices 106, to assist in balancing the discharges. Such a configuration adds complexity to the system, in that the controller needs to actuate the multiple discharge valves in response to a single soil contact indication, for example, increasing the amount of wiring and power needed to control the valves. However, the power requirement may be offset by the use of smaller discharge valves.

Figure 7:
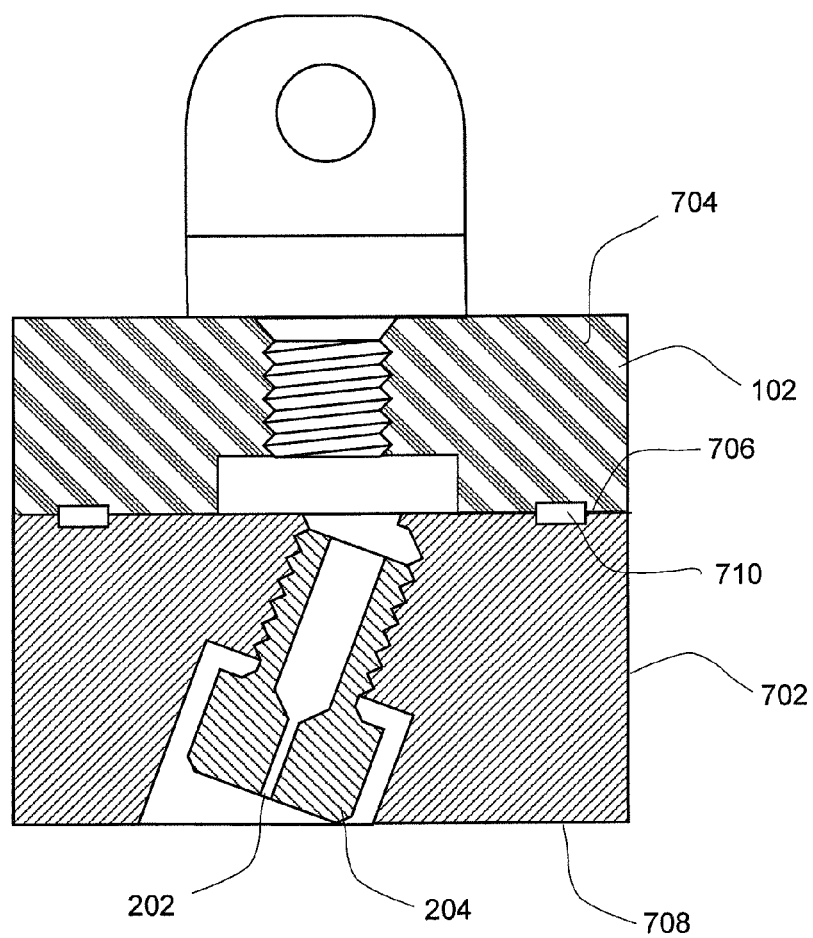
FIG. 7 illustrates a soil contact head for a portable device for placing soil treatments an exemplary embodiment of the present invention, wherein the soil contact head uses an angled discharge orifice, shown in cross-section along the plane defined by B-B' in FIG. 1.

As shown in FIG. 7, which shows a soil contact head 102 in cross-section along the plane shown as B-B' in FIG. 1, the structure of the soil contact head may be formed of multiple elements, to allow fabrication of discharge orifices 202 for directing the stream of a soil treatment fluid to be separate from the soil contact head 102 itself, such that the discharge orifices 202 may be formed in threaded discharge nozzles 204 may be changed based on different desired orifice diameters, or to replace a clogged orifice. Passages may be formed within the soil contact head 102, or within a lower soil contact head portion 702, to provide a path for distribution of the soil treatment fluid from a single connection source to the high pressure source of soil treatment fluid. An upper soil contact head portion 704 may be formed to act as a manifold between the discharge valve 106 (not shown in FIG. 7) and the discharge nozzles 204. Such a configuration may allow the manifold paths to be machined into the lower surface 706 of the upper soil contact head portion 704. The discharge orifices 202 may be angled with respect to bottom plane 708 of the soil contact head 102, such that soil treatment fluid may be injected towards an obstacle adjacent the treatment site. Where it is desired to place the soil treatment agent against a structure, but below the surface of soil abutting the structure, the desired angle may be derived based on the distance between the leading edge of the soil contact head and the discharge orifice 202 and the desired depth of penetration. A seal 710, such as a copper gasket, may be positioned between the upper soil contact head portion 704 and the lower soil contact head portion 702 to ensure sealing between the portions.

Figure 8:
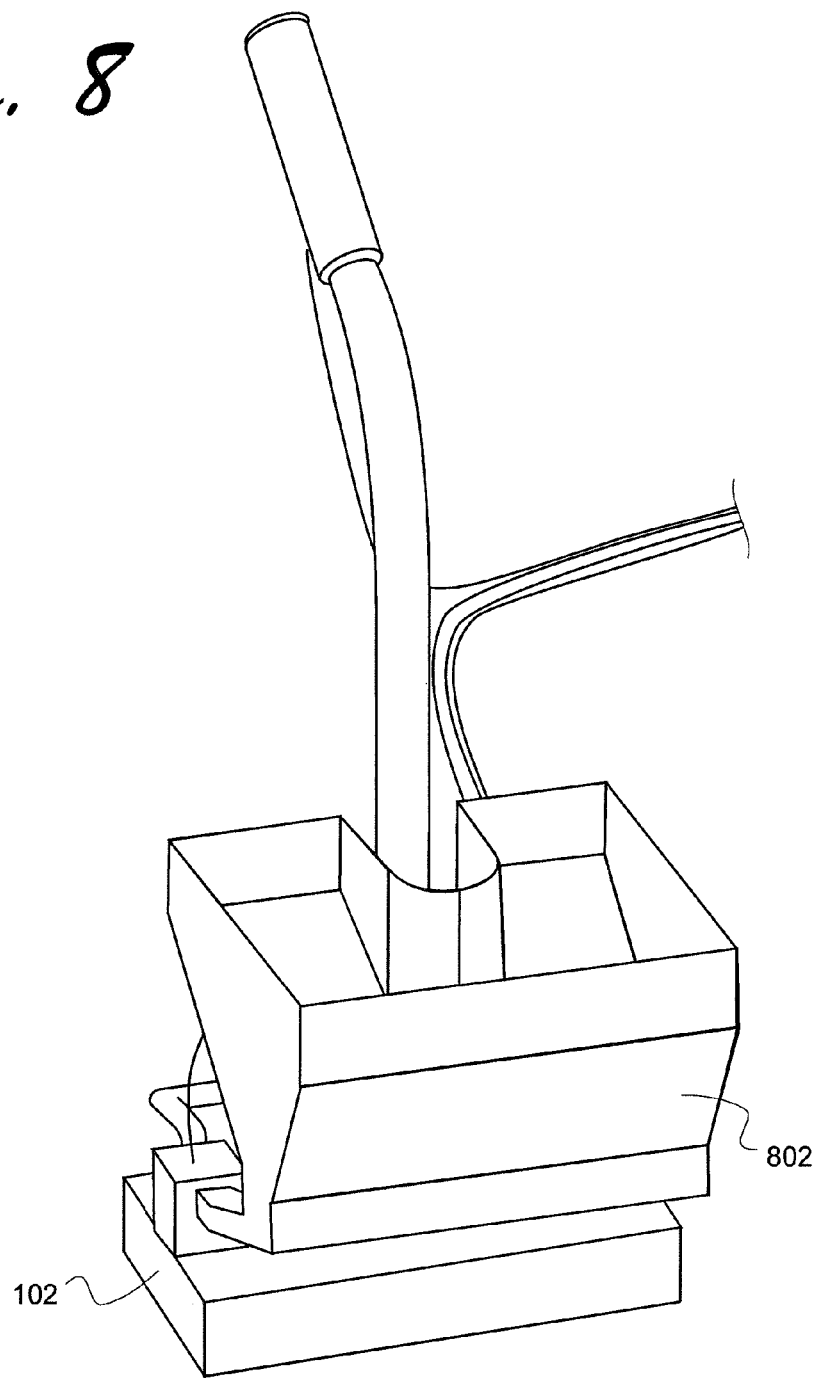
FIG. 8 illustrates a portable device for placing soil treatments in an exemplary embodiment of the present invention, utilizing a hopper for entraining granular material at a discharge orifice.

As illustrated in FIG. 1, the soil treatment fluid may be supplied via a hose 116 from a remote location. While this method may be preferable to allow a large volume of soil treatment fluid to be associated with a device 100, the use of a granular soil agent may require mixing of the granular soil treatment agent adjacent to the discharge valve or discharge orifice, in order to ensure that the proper amount of granular soil agent is entrained with the fluid. As shown in FIG. 8, mixing of a granular agent may be accomplished at the soil contact head 102 to ensure that a proper amount of granular soil agent is entrained with the pressurized fluid. The pressurized fluid in such an embodiment can be, but is not limited to, air or water. The granular agent may be supplied to the mixer in the soil contact head via a hopper 802 mounted to the soil contact head, however such a configuration would limit the amount of granular soil agent that the device 100 could be supplied with, as well as unduly increase the weight of the soil contact head 102. Alternately, a remote hopper, such as backpack mounted, could be provided to provide the supply of granular agent to the device. Such an implementation may be problematic in inducing granular material to flow through a hose between the hopper and the device, even with a pressure assist for the material, such that shorter paths are preferable should granular agents be desired to be used.

Figure 9:
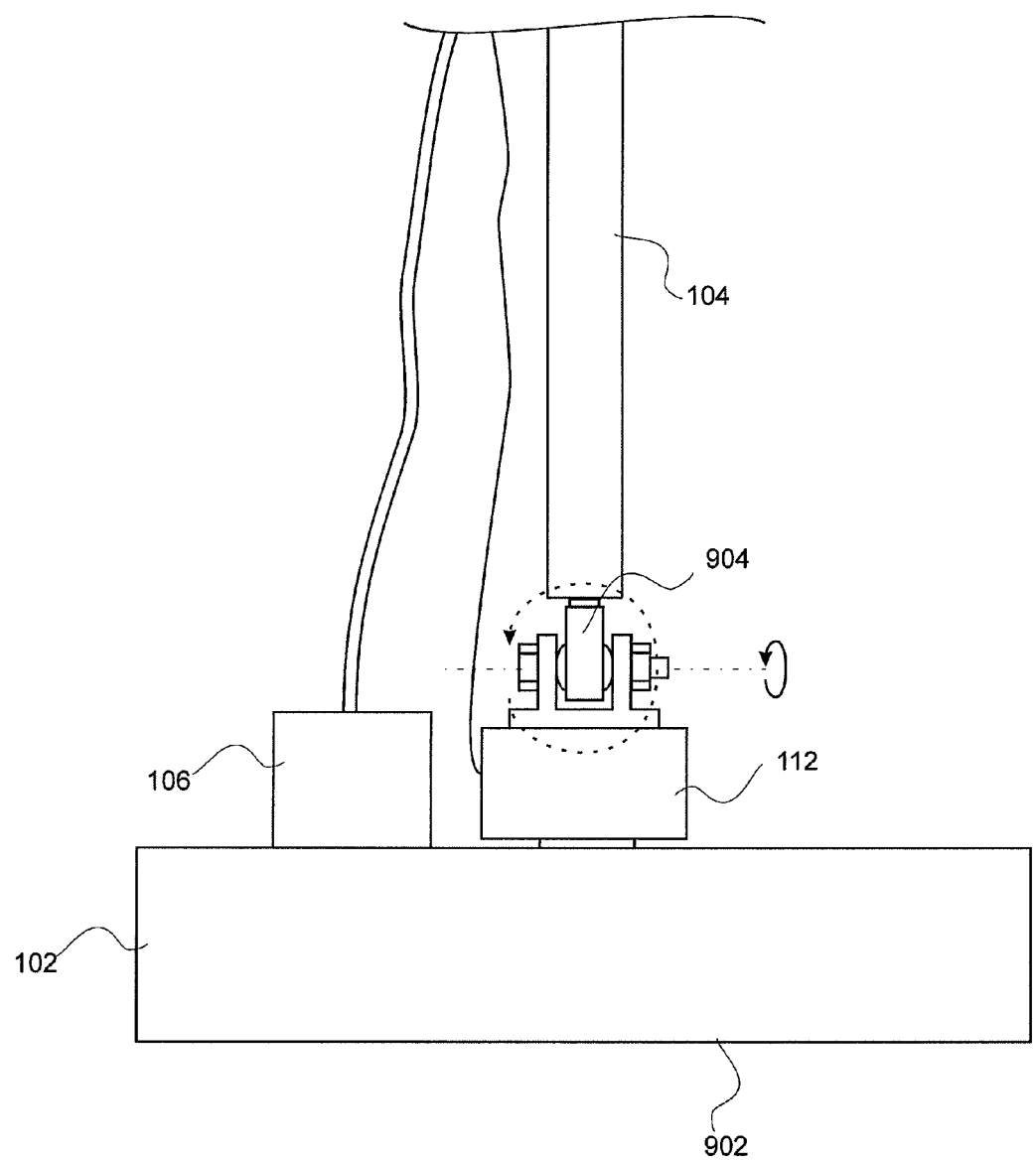
FIG. 9 illustrates a portable device for placing soil treatments an exemplary embodiment of the present invention, using a contact head having two rotational degrees of freedom.

As shown in FIG. 9, the soil contact head 102 may be provided with two degrees of rotational freedom relative to the handle 104 to further allow the bottom plane 902 of the soil contact head 102 to best orient itself against soil being treated. The junction between the handle 104 and the soil contact head 102 may be formed by a spherical joint, such as a heim joint 904. The junction may be further provided with a stabilizer to prevent rotation of the soil contact head relative to the handle 104, such that orientation of the soil contact head relative to the long axle of the handle can be maintained.

Use of a multiple degree of freedom joint may be implemented with any method of creating a soil contact signal. As shown in FIG. 9, a load cell 112 may be mounted to the soil contact head 102, which may then be mounted to the multiple degree of freedom joint 904. Alternately, a contact switch or other means of creating a contact signal may be used.

The soil treatment supply may consist of a reservoir attached to the soil treatment device, however, the soil treatment material is provided at a high pressure, in one embodiment, about 50 psi to about 5000 psi, in another embodiment, 100 psi to 4000 psi, and in another embodiment, about 2000 psi to about 5000 psi. The high pressures may limit the amount of soil treatment material that can be contained in the reservoir, if the reservoir is constrained to allow adequate portability of the device.

Figure 10:
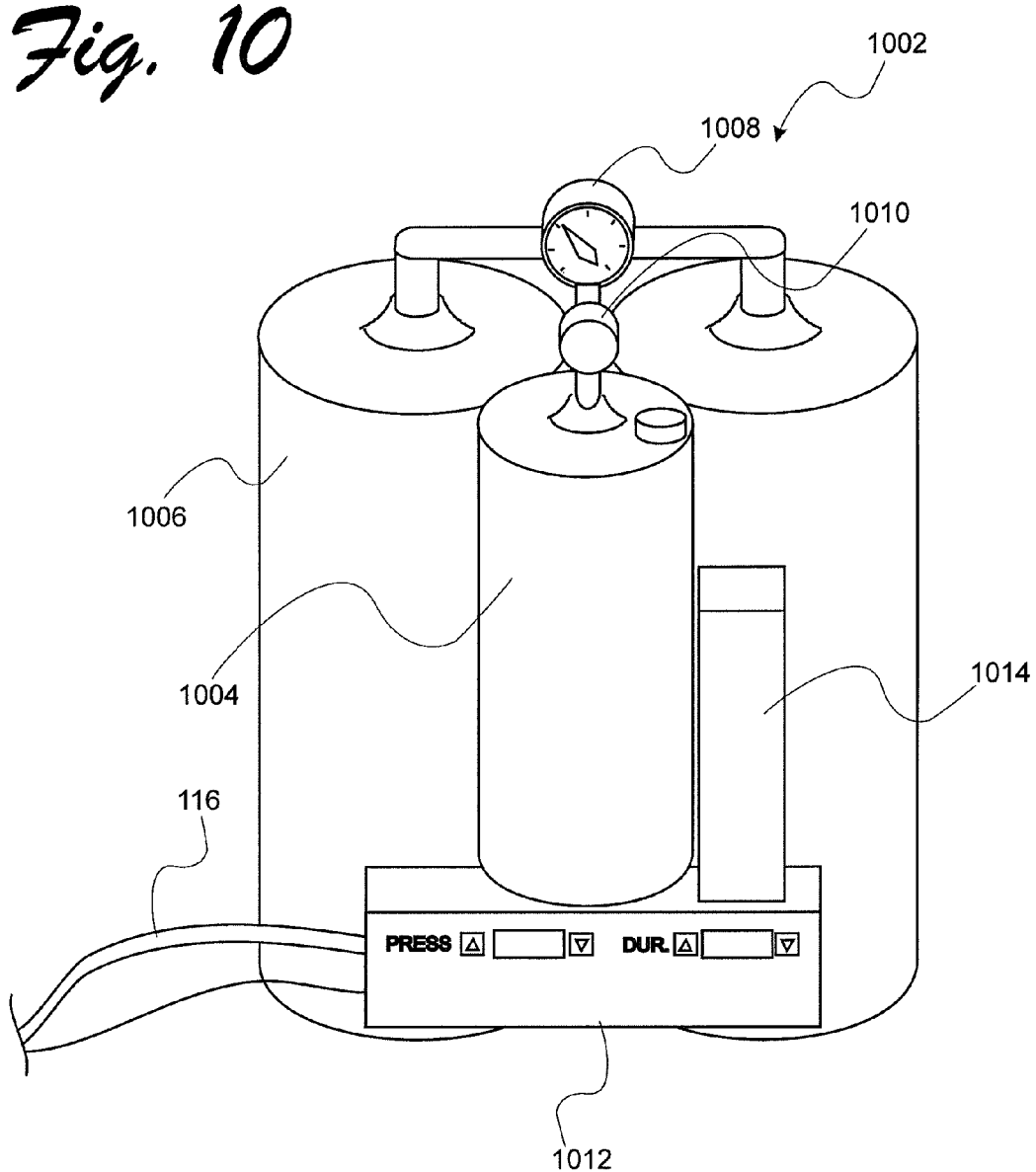
FIG. 10 illustrates a portable soil treatment fluid supply for use with a portable device for placing soil treatments in an exemplary embodiment of the present invention.

As shown in FIG. 10, the soil treatment supply may alternately consist of a separate man portable unit 1002 containing a soil treatment fluid reservoir 1004 and a pressure tank or tanks 1006, wherein the pressure tank 1006 is utilized to pressurize the soil treatment fluid reservoir 1004. A pressure regulator 1008 may be supplied to ensure that the pressure maintained in the soil treatment reservoir 1004 is maintained at a desired pressure. A shut off valve 1010 to isolate the soil treatment fluid reservoir 1004 from the pressure tank 1006 may also be provided, such that the soil treatment fluid reservoir 1004 may be depressurized to allow more soil treatment fluid to be added to the reservoir 1004. Additionally, the soil treatment fluid reservoir 1004 and pressure tank 1006 may be removeably attached to a back frame, such that the tanks can be changed on the back frame when depleted. Hose 116 may be used to connect the soil treatment fluid reservoir 1004 to the discharge valve 106 (not shown in FIG. 10), such that the soil treatment fluid can be provided to the discharge valve 106. The use of a pressurized tank is limited in that the soil treatment fluid is generally limited to being a pre-mixed liquid, since the weight and size constraints associated with mixing devices may limit the ability to provide a controller for mixing a granular material with a fluid at the man portable unit.

A controller 1012 and power source 1014 for the controller 1012 may additionally be provided on the man portable unit 1002, to allow control of the duration of a soil treatment fluid pulse released by the discharge valve 106, as well as to control the outlet pressure of the soil treatment fluid reservoir 1004.

Additionally, the controller 1012 may control actuation of the discharge valve 106 as the result of an actuator trigger, discussed above.

Figure 11:
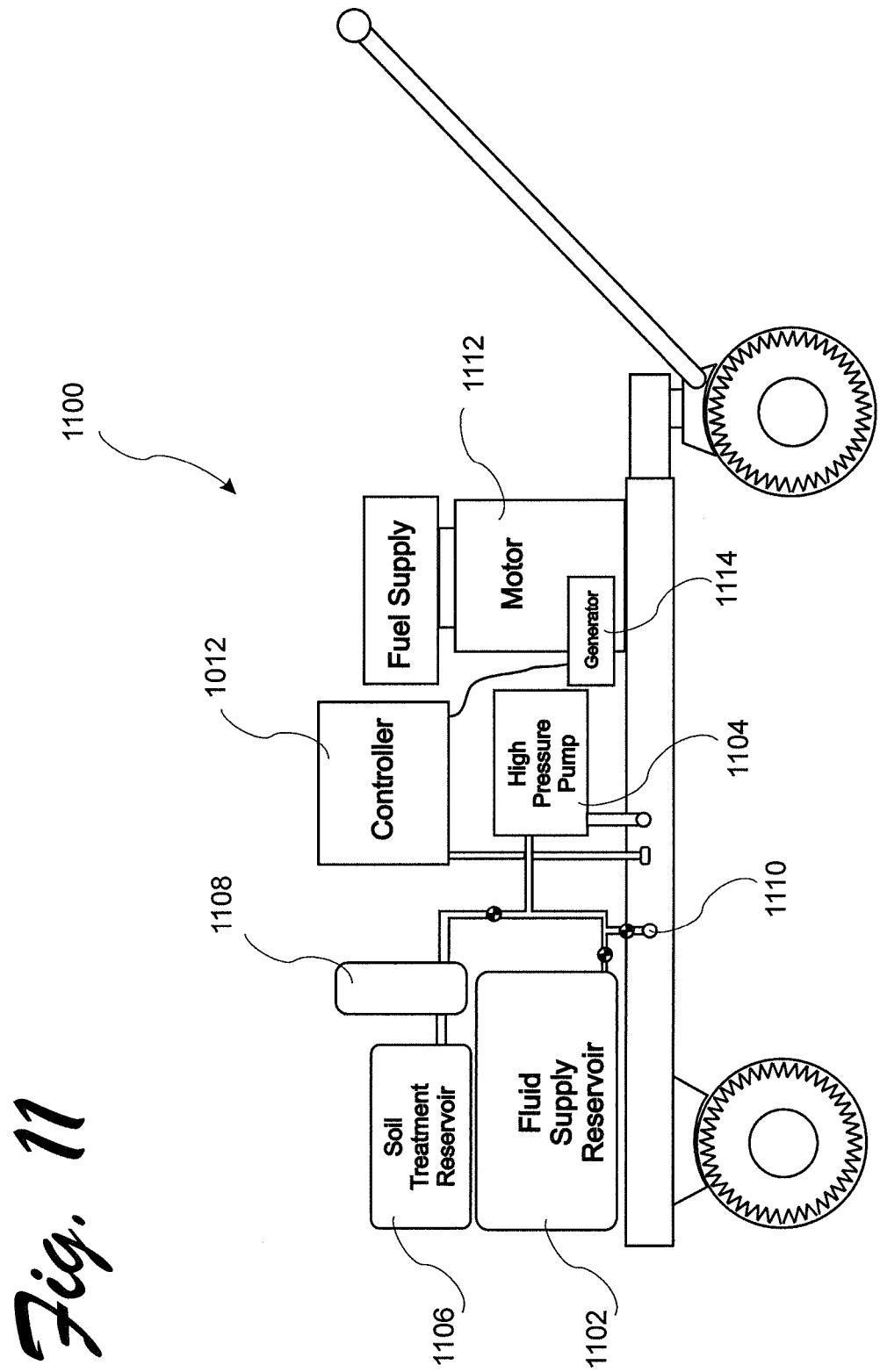
FIG. 11 illustrates an alternate portable soil treatment fluid supply for use with a portable device for placing soil treatments in an exemplary embodiment of the present invention.

In another embodiment, as shown in FIG. 11, the soil treatment fluid supply may be provided by a remotely located device 1100 incorporating a fluid reservoir 1102, a pump for pressurizing fluid 1104, a soil treatment reservoir 1106, and a mixing device 1108 such as a Dosatron® dispenser commercially available from Dosatron International, Inc., Clearwater, Fla. The fluid reservoir 1102 may be replaced by a source 1110 for a fluid for use with the device, such as a connection for receiving tap water. The remotely located device 1100 may be provided with a gasoline engine 1112 for generating power for operating the pressure pump 1104. The gasoline engine 1112 may additionally be provided with an alternator or generator 1114 for generating electrical current for operating varying functions of the remotely located device and/or the controller 1012. The remotely located device 1100 may be trailer mounted, self propelled, or even a combination thereof, such that the unit can be towed to a job site, then moved around a location under its own power.

The controller 1012 for the system may allow an operator to set a pulse duration and pressure level for soil treatments. The controller 1012 may be programmable to allow an operator to enter parameters associated with a particular soil treatment device in use, such as by defining the number of orifices and their sizes, parameters with a soil treatment material in use, such that dosing through the Dosatron® can be properly controlled, or a number of injections can be tracked, etc.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A device for treating soil, comprising:
   a soil contact head, said soil contact head having at least one discharge orifice therein;
   a handle, said soil contact head being attached to said handle;
   a discharge valve in fluid communication with said at least one discharge orifice;
   a soil contact indicator; and
   a source of pressurized fluid flowably connected to said discharge valve, wherein said discharge valve is operable to discharge pressurized fluid through said at least one discharge orifice when said soil contact indicator indicates contact between said soil contact head and the soil.

2. A device for treating soil according to claim 1, wherein said soil contact indicator comprises a force sensing device, said discharge valve being operable to discharge pressurized fluid through said discharge orifice when said soil contact indicator indicates a predetermined force between said soil contact head and the soil.

3. A device for treating soil according to claim 1, wherein said handle comprises a first portion and a second portion, said first portion being slidable relative to said second portion, and said soil contact indicator comprises a contact sensing device attached to said first portion of said handle and a contact block attached to said second portion of said handle, wherein said discharge valve is operable to discharge pressurized fluid through said discharge orifice when said contact sensing device contacts said contact block as a result of said first handle portion sliding relative to said second handle portion.

4. A device according to claim 3, further comprising a biasing member, said biasing member resists sliding movement of said first handle portion relative to said second handle portion.

5. A device according to claim 4, wherein said biasing member comprises a spring.

6. A device for treating soil according to claim 1, wherein said handle comprises a first portion and a second portion, said first portion being slidable relative to said second portion, and said soil contact indicator comprises a contact sensing device attached to a second portion of said handle and a contact block attached to said first portion of said handle, wherein said discharge valve is operable to discharge pressurized fluid through said discharge orifice when said contact sensing device contacts said contact block as a result of said first handle portion sliding relative to said second handle portion.

7. A device in accordance with claim 1, wherein said soil contact head is rotatable about a width axis of said soil contact head.

8. A device in accordance with claim 1, wherein said soil contact head is rotatable about a length axis of said soil contact head.

9. A device in accordance with claim 1, wherein said soil contact head is rotatable about a width axis of said soil contact head and about a length axis of said soil contact head.

10. A device in accordance with claim 1, further comprising an actuation switch, wherein both an actuation of said actuation switch, and an indication that said soil contact indicator indicates contact between said soil contact head and the soil are needed for the discharge valve to discharge pressurized fluid through said discharge orifice.

11. A device in accordance with claim 1, wherein said soil contact head comprises a plurality of discharge orifices.

12. A device in accordance with claim 1, wherein said soil contact head has a forward edge and a bottom plane, and said at least one discharge orifice is angled with respect to said bottom plane towards said forward edge.

13. A device in accordance with claim 12, wherein said discharge orifice is angled between approximately 5 degrees and approximately 30 degrees with respect to said bottom plane towards said forward edge.

14. A device in accordance with claim 1, wherein said device comprises a plurality of discharge orifices, and an equal number of discharge valves, wherein each said orifice has a discharge valve associated therewith.

15. A device in accordance with claim 1, wherein said soil contact head has a weight sufficient to limit motion of the soil contact head during discharge of soil treatment fluid.

16. A device in accordance with claim 1, wherein the source of pressurized fluid comprises a source of pressurized soil treatment.

17. A device for injecting a soil treatment fluid beneath soil, said device comprising:
   a soil contact head having at least one discharge orifice;
   a supply of soil treatment fluid;
   a force sensing device for sensing a predetermined soil contact force of said soil contact head on the soil;
   a discharge valve in fluid communication with said supply of soil treatment fluid, said discharge valve being operable to discharge a selected amount of soil treatment fluid when said force sensing device indicates said predetermined soil contact force.

18. A device in accordance with claim 17, wherein said force sensing device comprises a load cell, said discharge valve being operable to discharge soil treatment fluid through said at least one discharge orifice when said load cell indicates said predetermined soil contact force is transmitted through said load cell.

19. A device in accordance with claim 18, wherein said load cell comprises a multi-axis load cell, wherein forces transmitted through said load cell are resolved to determine a vertical force applied to said soil contact head along a vertical axis associated with said soil contact head, said discharge valve being operable to discharge soil treatment fluid from said discharge orifice when a sufficient vertical force is imposed upon said soil contact head.

20. A device in accordance with claim 17, further comprising a handle, said soil contact head being attached to said handle.

21. A device for injecting a soil treatment fluid beneath soil, said device comprising:
    a soil contact head having at least one discharge orifice;
    a supply of soil treatment fluid in fluid communication with said soil contact head;
    a soil contact indicator;
    a discharge valve for discharging soil treatment fluid through said at least one discharge orifice, said discharge valve being operable to discharge a selected amount of soil treatment fluid when said soil contact indicator indicates contact between said soil contact head and the soil.

22. A device in accordance with claim 21, wherein said discharge valve is moveable between an opened position and a closed position, said soil treatment fluid being allowed to flow through said discharge valve with said discharge valve is in said opened position.

23. A device in accordance with claim 21, further comprising a handle, said soil contact head being attached to said handle.

24. A method of injecting a soil treatment fluid beneath the surface of the ground, said method comprising:
    providing a soil treatment device comprising a soil contact head, the soil contact head having at least one discharge orifice therein, a discharge valve in fluid communication with the at least one discharge orifice, a soil contact indicator, and a source of pressurized soil treatment fluid flowably connected to said discharge valve;
    positioning the soil treatment device such that the soil contact head is in contact with the surface of the ground;
    delivering the pressurized soil treatment fluid to the discharge valve; and
    injecting the soil treatment fluid into the ground by opening the discharge valve to permit the soil treatment fluid to flow through the at least one discharge orifice and into the ground.

25. The method in accordance with claim 24 wherein said soil contact indicator comprises a force sensing device, and said injecting the soil treatment fluid comprises:
    applying a predetermined force to the soil contact head; and
    discharging pressurized soil treatment fluid through said discharge orifice when the soil contact indicator indicates the predetermined force between the soil contact head and the surface of the ground.

26. The method in accordance with claim 24 wherein the soil treatment device further comprises a handle, said handle having a first portion and a second portion, the first portion being moveable relative to the second portion, and the soil contact indicator comprises a contact sensing device attached to the first portion of the handle and a contact block attached to said second portion of said handle, and said injecting the soil treatment fluid comprises:
    moving said first handle portion relative to said second handle portion to cause the contact sensing device to contact the contact block;
    discharging pressurized soil treatment fluid through said discharge orifice when the contact sensing device contacts the contact block.

27. The method in accordance with claim 26 wherein said handle includes a biasing member for resisting movement of said first portion relative to said second portion.

28. The method in accordance with claim 24 wherein the soil treatment device further comprises an actuation switch; and said injecting the soil treatment fluid comprises:
    actuating the actuation switch;
    applying a predetermined pressure to the soil with the soil contact head; and
    discharging the soil treatment fluid from the at least one discharge orifice when the soil contact indicator indicates that the predetermined pressure is applied to the soil by the soil contact head.

29. The method in accordance with claim 24 wherein the soil contact indicator comprises a load cell; and said injecting the soil treatment fluid comprises:
    applying a predetermined pressure to the soil with the soil contact head; and
    discharging the soil treatment fluid from the at least one discharge orifice when the load cell indicates the predetermined pressure is transmitted through the load cell.

30. A device for injecting a soil treatment fluid beneath a soil surface, said device comprising:
    a soil contact head comprising at least one internal passage and being configured to rest on the soil surface in contact therewith;
    a discharge valve in fluid communication with said at least one internal passage;
    a supply of soil treatment fluid in fluid communication with said discharge valve;
    at least one discharge orifice in the soil contact head in fluid communication with said at least one internal passage whereby the at least one discharge orifice is disposed above the soil surface; and
    a soil contact indicator.

31. The device for treating soil according to claim 30, wherein said soil contact indicator comprises a force sensing device, said force sensing device being response to a force applied by said soil contact head to the soil.

32. The device for treating soil according to claim 30, wherein said soil contact indicator comprises a load cell, said load cell being response to a force applied by said soil contact head to the soil.

33. The device for treating soil according to claim 32, wherein said load cell comprises a multi-axis load cell.

34. The device for treating soil according to claim 30, further comprising a handle for carrying said soil contact head, said handle comprising a first portion and a second portion, said first portion being moveable relative to said second portion, and said soil contact indicator comprises a contact sensing device attached to at least one of said first portion and said second portion of said handle, said contact sensing device being activated as a result of said first handle portion being moved relative to said second handle portion.

35. The device for treating soil according to claim 34, further comprising a biasing member, said biasing member resisting movement of said first handle portion relative to said second handle portion.

36. The device for treating soil according to claim 35, wherein said biasing member comprises a spring.

37. The device for treating soil according to claim 30, wherein said soil contact head is rotatable about at least one of a width axis of said soil contact head and a length axis of said soil contact head.

38. The device for treating soil according to claim 30, further comprising an actuation switch.

39. The device for treating soil according to claim 30, wherein said soil contact head has a forward edge and a bottom plane, and said at least one discharge orifice is angled with respect to said bottom plane towards said forward edge.

40. A device for treating soil, comprising:
- a soil contact head, said soil contact head having at least one discharge orifice therein;
- a discharge valve in fluid communication with said at least one discharge orifice;
- a handle for carrying said soil contact head, the handle comprising a first handle portion, a second handle portion, and a sensing device, the first handle portion being moveable relative to the second handle portion, the sensing device being adapted to sense relative movement of the first handle portion with respect to the second handle portion; and
- a source of soil treatment fluid fluidly connected to said discharge valve, wherein said discharge valve is operable to discharge soil treatment fluid through said at least one discharge orifice when said sensing device senses movement of the first handle portion relative to the second handle portion.

41. The device in accordance with claim 40 wherein the sensing device comprises a contact switch mounted on the first handle portion and a stop block mounted on the second handle portion.

42. The device in accordance with claim 40 wherein the first handle portion is slidable relative to the second handle portion.

43. The device in accordance with claim 42 wherein the handle further comprises a spring disposed relative to the first and second handle portions of the handle such that movement of the first handle portion relative to the second handle portion compresses the spring.

44. The device in accordance with claim 40 wherein the discharge valve comprises a solenoid.

45. A device for treating soil, comprising:
- a soil contact head, said soil contact head having at least one discharge orifice therein;
- a handle, said soil contact head being attached to said handle;
- a discharge valve in fluid communication with said at least one discharge orifice;
- a source of soil treatment fluid in fluid communication with said discharge valve, wherein said discharge valve is operable to discharge soil treatment fluid through said at least one discharge orifice; and
- a reservoir carried by the device for containing a supply of soil treatment fluid.

46. The device in accordance with claim 45 wherein the supply of soil treatment fluid comprises a supply of a solution of a treating agent and water.

47. The device in accordance with claim 45 wherein the reservoir is mounted on a cart.

* * * * *